Nov. 14, 1967  E. SORENSEN  3,352,402
APPARATUS FOR HANDLING OBJECTS
Filed July 15, 1966  2 Sheets-Sheet 2

United States Patent Office 3,352,402
Patented Nov. 14, 1967

3,352,402
APPARATUS FOR HANDLING OBJECTS
Elo Sorensen, Virum, near Copenhagen, Denmark, assignor to Carmo Aktieselskab, Espergaerde, Denmark
Filed July 15, 1966, Ser. No. 565,484
Claims priority, application Denmark, July 16, 1965, 3,668/65
4 Claims. (Cl. 198—33)

ABSTRACT OF THE DISCLOSURE

An apparatus for delivering articles such as buttons which are fed to one or more hoppers arranged above one or more horizontally arranged rotating conveying spindles, each having a helical rib and being surrounded by a guard constituting a supporting edge for the articles which by the ribs are transmitted axially along the spindles which are surrounded by a horizontally arranged rotating drum having inside carrier vanes adapted to feed the articles from the bottom of the drum to the hoppers.

---

The invention relates to an apparatus for handling objects.

In series manufacture of garments, for example children's trousers of plastic material, a number of plastic press buttons or snap fasteners have to be attached by welding, and preferably, a number of buttons are welded simultaneously on the garments. These buttons are supported in a carrying member which constitutes a welding electrode and which is subsequently pressed against the garment. The present invention is concerned with an apparatus applicable, for example, to place such buttons in the carrying member, and it is necessary firstly, that the buttons be conveyed from a storage zone to the carrying member and, secondly, that the buttons be placed in the carrying member in proper position, that is, with the proper side facing upwards in the carrying member.

The placement of the buttons in the carrying member has heretofore been effected manually and it is an object of the invention to provide an apparatus for handling buttons wherein the apparatus is capable of fully automatic operation in such manner as to ensure that at the discharge end of the apparatus buttons are fed at such a rate that a regularly operating collecting member may be fed continuously with the desired number of buttons.

An essential feature of the apparatus according to the invention is the provision of a drum with internal longitudinal carrier vanes rotated about a substantially horizontally disposed longitudinal axis and one or more rotating spindles lying side by side and extending through the central part of the said drum substantially parallel with the longitudinal axis of the drum, each of the said spindles having an external helical conveying rib and each spindle being shielded along part of its circumference by a guard having a supporting edge, for the conveyed objects disposed, a particular distance beyond the vertical diametral plane of the spindle viewed in the direction of rotation of the spindle.

Figure 1:
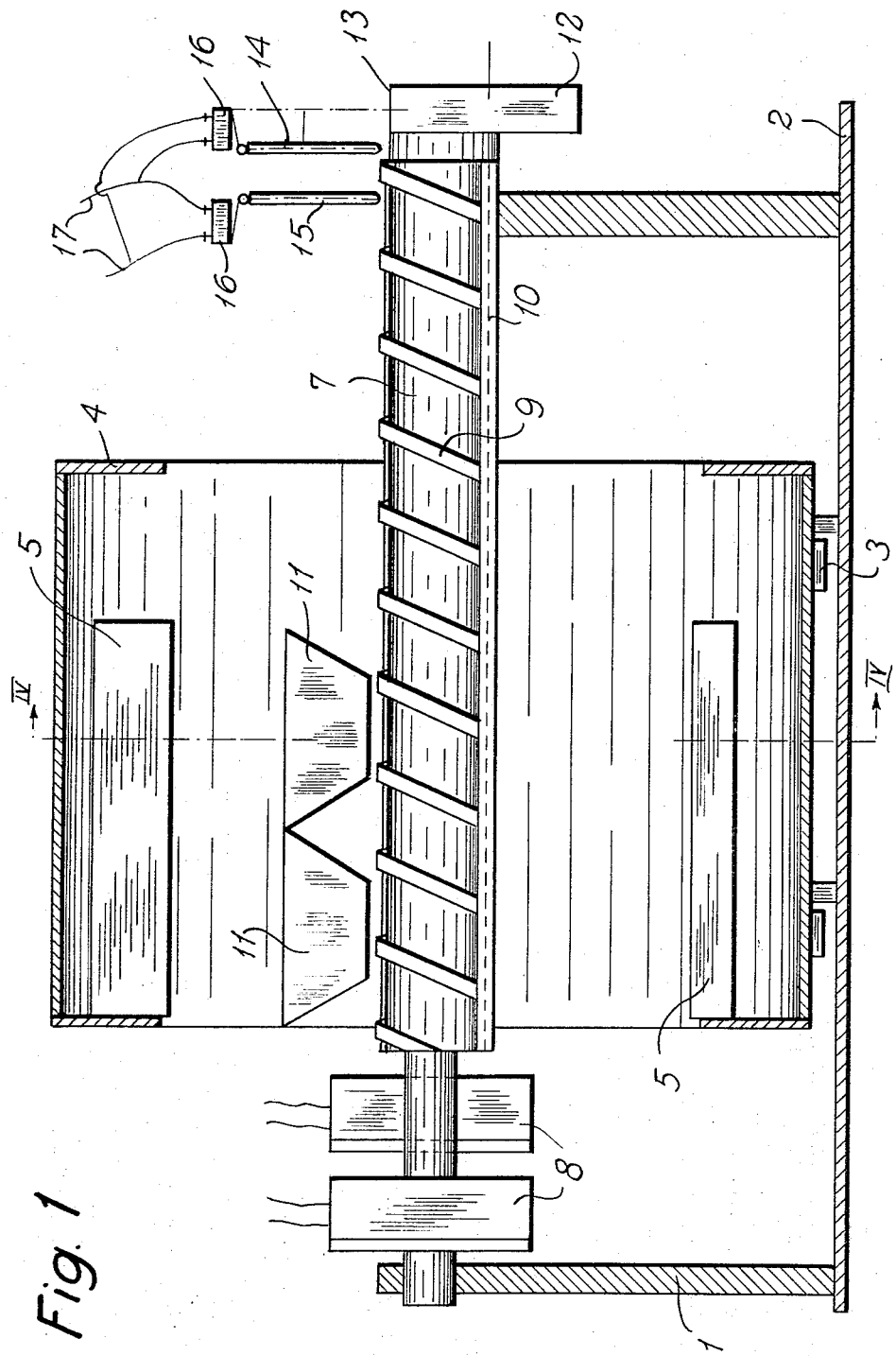
Figure 2:
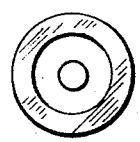
Figure 2A:
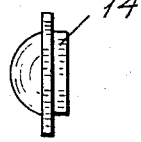
Figure 3:
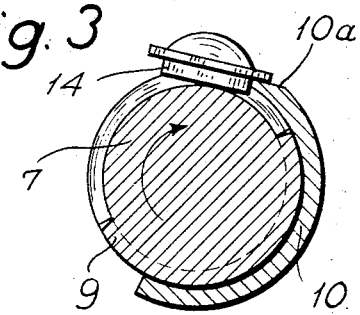
Figure 4:
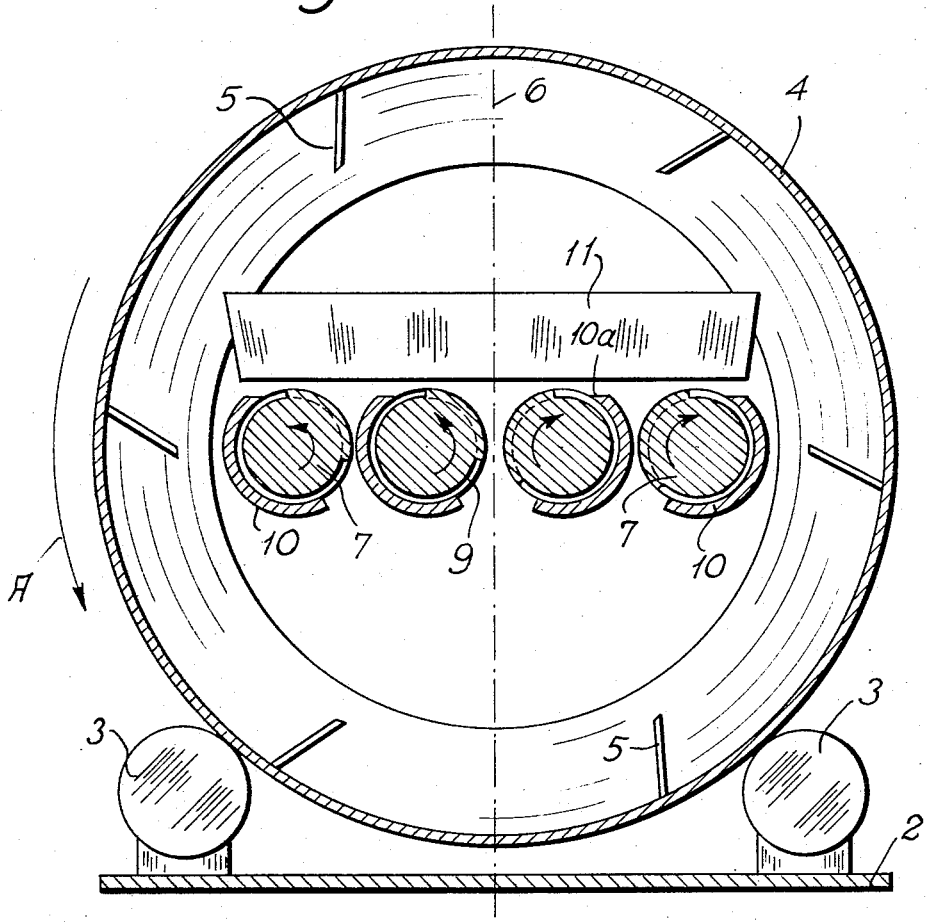

An embodiment of the apparatus according to the invention will now be described with reference to the drawing, in which FIGURE 1 is a schematic representation of the apparatus, viewed from the side and partly in section, FIGURE 2 is an end view and a side view of a press button half-part, FIGURE 3 is a section through a spindle, and FIGURE 4 is a section on the line IV—IV of FIGURE 1.

The apparatus consists of a frame 1 with a base plate 2 on which are mounted bearing brackets for supporting rollers 3 for a cylindrical drum 4 which is rotated about its horizontally disposed longitudinal axis by an electromotor (not shown).

Inside the drum, at one end thereof, are provided six carrier vanes 5 extending from the inner wall of the drum towards its central part, forming an angle with the corresponding diametral planes.

On either side of the vertical diametral plane 6 of the drum are provided two spindles 7 the axes of which are parallel with the longitudinal axis of the drum 4, each of the said spindles being connected with an electromagnetic coupling 8 by means of which they are connected with an electromotor (not shown) so that they may be rotated in the directions indicated by the arrows in FIGURE 4, that is, the spindles are rotated in pairs in a direction upwards and away from the vertical diametral plane 6.

Each spindle is provided with a helical conveying rib 9 and is shielded by a guard 10 which extends over about 180° of the circumference of the spindle and the guard is designed at its upper end to form a supporting edge 10a located a short distance from the upper generatrix of the spindle, in the direction of rotation of the spindle, that is, the guards are located on the left-hand side of the two spindles located to the left of the diametral plane 6, and on the right-hand side for the two other spindles. The guards are stationary.

At the end of the drum where the carrier vanes 5 are provided there are mounted two hoppers 11 above the spindles. As shown in FIGURE 4, the hoppers extend above the surface of all of the four spindles.

The apparatus serves to convey press-buttons of the kind illustrated in FIGURE 2 to a carrying member 12 which is formed as a welding electrode, which in its upper surface 13 has four depressions opposite the four spindles 7, suitable for receiving a projecting part 14 of the press button. The press buttons are conveyed to the carrying member 12 in a position in which the part 14 is facing downwards.

Each spindle has directly in front of the carrying member 12 a clearance, and above the said clearance is a feeler 14 mounted in front of another feeler 15. Both feelers are connected with electric switches 16 which, in turn, are connected through wires 17 with control members for the electromagnetic couplings 8.

The apparatus operates in the following manner: The drum 4 rotates continuously in the direction indicated by the arrow A in FIGURE 4 and the four spindles 7 are rotated discontinuously in the direction of the arrows indicated in FIGURE 4 as will be described hereinafter. A comparatively large number of press buttons according to FIGURE 2 are placed at the bottom of the drum 4 which, as shown in FIGURE 1, is open at its ends, and the said buttons will then be passed up into the upper part of the drum by the carrier vanes 5, from where they fall into the hoppers 11 which contain a large number of buttons of which the lower ones are seized by the conveying ribs 9 and advanced to the right in FIGURE 1. The spindles with their ribs and the guards 10 are formed and placed in such manner that press buttons having their part 14 facing upwards will slide over the supporting edge 10a of the guard 10 and fall to the bottom of the drum 4. The guards and the spindles are mounted with such a spacing as to permit press buttons to fall down between them. Press buttons correctly arranged, that is, with the part 14 facing downwards, will rest in contact with the supporting edge 10a as indicated in FIGURE 3 and will be advanced towards the right in FIG. 1 by the conveying rib 9, the buttons sliding along the supporting edge 10a.

The feelers 14 and 15 normally close switches 16 such that the magnetic couplings 8 are continually energized and keep the spindles rotating until two press buttons are fed to the discharge end of the apparatus, i.e., are directly in front of the carrying member 12, at which time the buttons engage feelers 14, 15 and the coupling 8 of the spindle is de-energized and the said spindle stops rotating.

When only one press button is left, that is, when the first button has been passed to the carrying member 12, the spindle involved is started and is not again stopped until there are at least two press buttons at the discharge end. The press buttons are pushed from the clearance of the spindle on to the carrying member 12 which is then moved in a direction away from the spindle towards a welding electrode where the press buttons are placed on a garment. These members do not constitute any part of the present invention and no further description is given. However, it is a very important function for the spindle to continue its rotation until at least two consecutive buttons are at the discharge end since this will ensure that each movement of the carrying member 12 contains the requisite number of buttons. Thus after the delivery of the endmost button on said spindle 7 to the carrier 12, the spindles are rotated until two consecutive buttons are located at the end of the spindle.

In the embodiment disclosed, the member 14 moves to and fro in a horizontal direction, pushing the extreme press button on to the carrying member 12, after which the next succeeding press button is passed into the clearance, the two members 14 and 15 simultaneously acting as feeler and switch activating members as already mentioned.

It is of special importance for the reliable operation of the apparatus that there be a very large surplus of buttons fed to the spindles, most of which fall to the bottom of the drum. The great surplus of buttons ensures that there will always be at least two buttons properly oriented at the discharge end, whereby an automatically operating collecting mechanism can always be fed with 100% security.

What I claim and desire to secure by Letters Patent is:

1. An apparatus for handling objects, comprising a drum for containing objects to be handled, said drum including internal longitudinal carrier vanes, said drum being supported for rotation about a substantially horizontally disposed longitudinal axis, and at least one rotatable spindle extending through the central part of the said drum substantially parallel with the longitudinal axis of the drum, each spindle including an external helical conveying rib, and a guard member encircling each spindle along a part of its circumferential surface, said guard member having a supporting edge for the conveyed objects disposed a specific distance beyond the vertical diametral plane of the spindle viewed in the direction of rotation of the spindle.

2. An apparatus as claimed in claim 1, comprising at least one stationary hopper located above the spindle for collecting objects falling from the carrier vanes to direct the objects to the surface of the spindle.

3. An apparatus as claimed in claim 1 wherein a plurality of spindles are mounted on either side of the vertical diametral plane of the drum, said spindles being rotated in directions upwards and away from the vertical diametral plane.

4. An apparatus as claimed in claim 1 wherein the guard member extends over about 180° of the circumference of the spindle, the distance between the surfaces of the spindle and the surface of the guard member being sufficient so that the objects conveyed are able to pass therebetween.

References Cited

UNITED STATES PATENTS 3,070,209  12/1962  Young _____ 198—33

EDWARD A. SROKA, *Primary Examiner.*